United States Patent [19]

Bishop et al.

[11] Patent Number: 4,864,103
[45] Date of Patent: Sep. 5, 1989

[54] CANISTER COVER HEATER FOR AUTOMOTIVE VAPOR CANISTER

[75] Inventors: Robert P. Bishop, Halifax; Peter G. Berg, Attleboro Falls; Stephen B. Offiler, Attleboro, all of Mass.

[73] Assignee: Texas Instruments Incorporated, Dallas, Tex.

[21] Appl. No.: 205,880

[22] Filed: Jun. 13, 1988

Related U.S. Application Data

[62] Division of Ser. No. 877,587, Jun. 23, 1986, Pat. No. 4,778,495.

[51] Int. Cl.$^4$ ............................................. B01D 51/00
[52] U.S. Cl. .................................... 219/375; 55/208; 55/269; 55/316; 55/387; 123/519; 123/549; 219/202; 219/504; 219/505
[58] Field of Search ............... 55/208, 269, 316, 387; 123/518, 519, 549; 219/202, 205, 206, 504, 505, 359, 375, 366

[56] References Cited

U.S. PATENT DOCUMENTS

| | | | |
|---|---|---|---|
| 3,476,293 | 11/1969 | Marcoux | 222/146 |
| 4,108,125 | 8/1978 | Marcoux | 123/122 F |
| 4,193,383 | 3/1980 | Rogers | 55/316 |
| 4,206,645 | 6/1980 | Orcutt | 73/349 |
| 4,406,785 | 9/1983 | Siefer | 210/186 |
| 4,473,054 | 9/1984 | Marcoux et al. | 123/557 |
| 4,598,686 | 7/1986 | Lupoli et al. | 55/208 |

Primary Examiner—A. D. Pellinen
Assistant Examiner—Jeffrey A. Gaffin
Attorney, Agent, or Firm—James P. McAndrew; John A. Haug; Melvin Sharp

[57] ABSTRACT

A cover for an automotive vapor canister has a heat-spreading member heated by a self-regulating electrical resistance heater of positive temperature coefficient of resistivity for heating air which is periodically introduced into the canister for purging the canister. The cover has a first cover of thermally insulating material defining a thin inner air flow path section to pass air being introduced into the canister over the heat-spreading member for transferring heat to the air and to receive additional heat within the first cover and has a second cover of thermally insulating material defining a thin outer air flow path section overlying and connected with the inner air flow path section to pass the air over the first cover prior to being advanced into the inner flow path section for withdrawing said additional heat from the first cover to preheat the air and improve air heating efficiency.

2 Claims, 6 Drawing Sheets

CANISTER COVER HEATER FOR AUTOMOTIVE VAPOR CANISTER

This application is a division of application Ser. No. 877,587, filed June 23, 1986 which is now U.S. Pat. No. 4,778,495.

BACKGROUND OF THE INVENTION

The field of this invention is that of automotive vapor canisters and the invention relates more particularly to covers for such canisters adapted to heat air which is periodically introduced into the canisters for purging the filter materials in the canister.

Automotive vapor canisters are conventionally arranged to receive fuel vapors from fuel tanks and from carburetors or comparable engine components during some periods of the automotive vehicle use cycle for filtering the vapors through carbon filter particles to release only vapor-free air to the surrounding atmosphere. The filter particles are periodically purged of vapors by passing air back through the carbon filter particles into the carburetor or other portion of the engine intake during engine operation so hydrocarbons purged from the canister are consumed by the engine. It has been known that removal of hydrocarbons from the carbon particles requires heating of the purging air for achieving desirable canister purging efficiency and it is found that the provision of electric heating for such canister purging air as previously proposed has tended to result in bulky or expensive canister heater structures and has resulted in a significant drain on available automotive electric power in competing for available power with the power required for all other vehicle electrical loads.

BRIEF SUMMARY OF THE INVENTION

It is an object of this invention to provide a novel and improved automotive vapor canister heater; to provide a cover for such a canister which incorporates improved means for heating air which is periodically introduced into the canister for purging filter materials in the canister; to provide such a canister cover for heating purging air with improved efficiency to reduce drain on the power available from the automotive electrical power supply system; and to provide such a canister cover heater which is compact, rugged and characterized by low cost and ease of assembly.

Briefly described, the novel and improved canister cover heater for an automotive vapor canister or filter as provided by this invention comprises a metal heat-spreading plate member or the like preferably formed of a sheet metal material such as aluminum having relatively high thermal conductivity. A self-regulating electrical resistance heater disc element of a ceramic material or the like of positive temperature coefficient of resistivity is secured to one side of the heat-spreading member in a heat-transfer relation and a first cover means of a thermally insulating material is secured over the heat-spreading member to define a thin inner air flow path section to pass air being introduced into the canister over the heat-spreading plate for transferring heat to the air such that at least some additional heat is received within the first cover means. In accordance with this invention, a second cover means is secured over the first cover means for defining a second outer air flow path section which overlies and is connected with the inner air flow path section to pass the air over the first cover means prior to being advanced into the inner flow path section for withdrawing said additional heat from the first cover means to preheat the air and improve air heating efficiency.

In that arrangement, the canister cover heater is found to be compact and inexpensive; the use of a single sheet metal material in the heat-spreading member and the securing of a self-regulating positive temperature coefficient heater to the heat-spreading member provides a safe and efficient means for providing a substantial amount of heat within the heat-spreading member; and the arrangement of first and second cover means of thermally insulating material such as glass-filled nylon or the like to define inner and outer overlying and interconnected air flow path sections is found to substantially prevent loss of such heat from the cover so that very high air heating efficiency is achieved in a low cost structure, thereby to permit use of a relatively small heater element for reducing drain on available automotive electrical power.

DESCRIPTION OF THE DRAWINGS

Other objects, advantages and details of the novel and improved cover heater for an automotive vapor filter canister appear in the following detailed description of preferred embodiments of the invention, the detailed description referring to the drawings in which.

DESCRIPTION OF THE PREFERRED EMBODIMENTS

Figure 1:
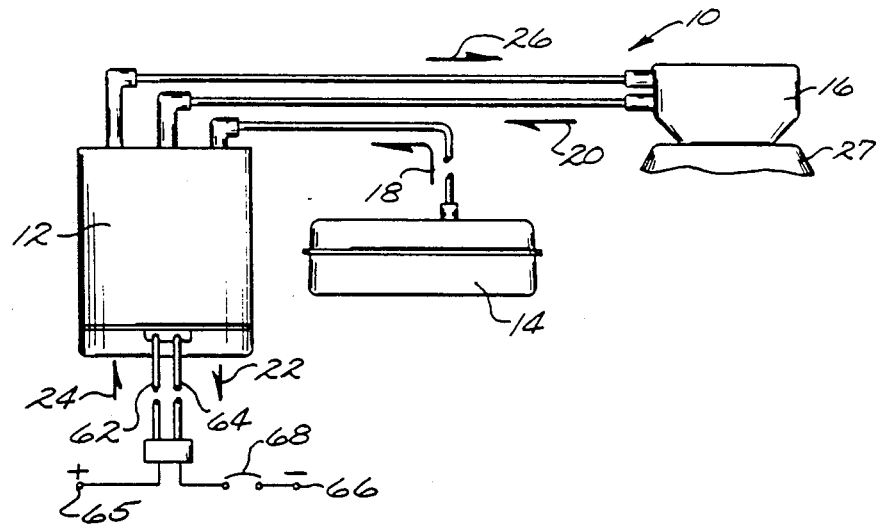
FIG. 1 is a diagrammatic view illustrating use of a bottom air entry automotive canister evaporative emissions system.
Figure 2:
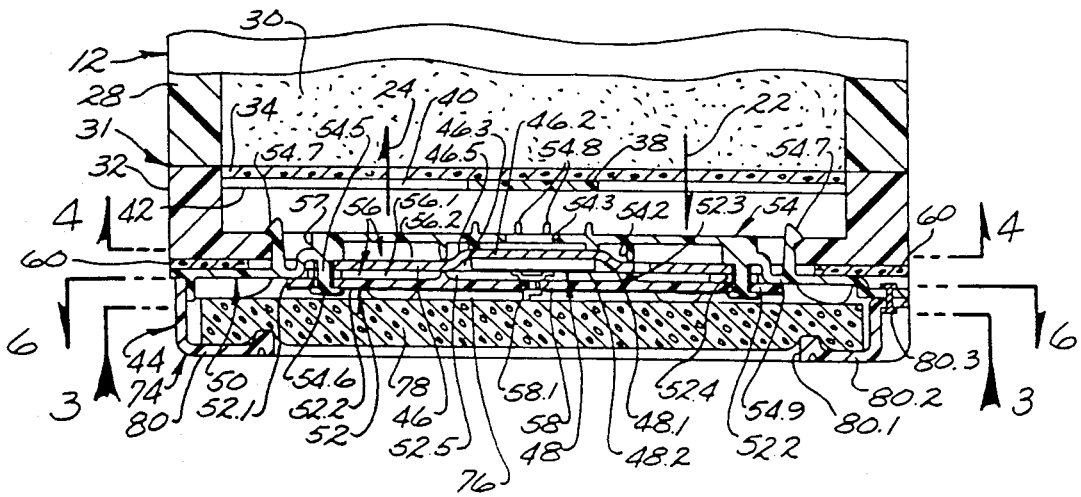
FIG. 2 is an enlarged, partial, front elevation view, partially in section, of the canister of FIG. 1 illustrating a preferred embodiment of the canister cover heater of this invention.

Referring to the drawings, 10 in FIG. 1 illustrates an automotive vapor filter canister system which is shown to include a conventional bottom air entry vapor canister 12 arranged to receive vapor-laden air from a fuel tank 14 and/or from a carburetor 16 or comparable engine components through tubes as indicated by arrows 18 and 20 for passing the vapors through the canister 12 to be filtered before the air is released to the surrounding atmosphere as indicated by arrow 22. The canister also draws fresh air into the canister periodically as indicated by the arrow 24 for purging the filter materials in the canister of the vapors and for delivering the purging air and vapors withdrawn from the canister with the purging air into the carburetor or some other portion of the engine intake as indicated by arrow 26 to be consumed by the engine 27 during engine operation. For example, when operation of engine 27 is terminated, engine temperature normally increases for a brief time after coolant flow ends. As a result fuel remaining in the carburetor tends to vaporize and develop a pressure sufficient to move the vaporized fuel through the canister as indicated by arrows 20 and 22. Similarly when a parked vehicle is exposed to increased temperatures at midday, expansion of air and fuel in the vehicle fuel tank provides a similar pressure to pass air and fuel vapors through the canister as indicated by arrows 18 and 22. However when the engine 27 is operated, engine vacuum is applied to the canister via the engine intake manifold for drawing air into the canister to purge the filter materials in the canister and for delivering the purging air and hydrocarbons and the like purged from the filter materials into the carburetor or intake manifold to be consumed during engine operation as indicated by arrows 24 and 26. In that way the system significantly reduces air pollution related to automotive vehicle operation at very limited cost. As the vapor filter system as thus far described is conventional, it is not further described herein and it will be understood that the canister 12 typically includes a canister cylinder 28 as shown in FIG. 2 filled with a conventional carbon particulate or granular filter material 30 such as activated charcoal or the like and has a canister bottom 32 which is typically attached to the canister cylinder at seam 31 by adhesive means or by spin welding or the like to position a porous, organic foam, particle-retaining pad 34 at the bottom of the canister cylinder, the canister bottom having a grid formed by a center part 38 and radiating arms 40 forming a bottom air entry 42 into and out of the canister through which filtered or fresh air is permitted to freely pass as indicated by arrows 22 and 24 in FIG. 2.

Figure 4:
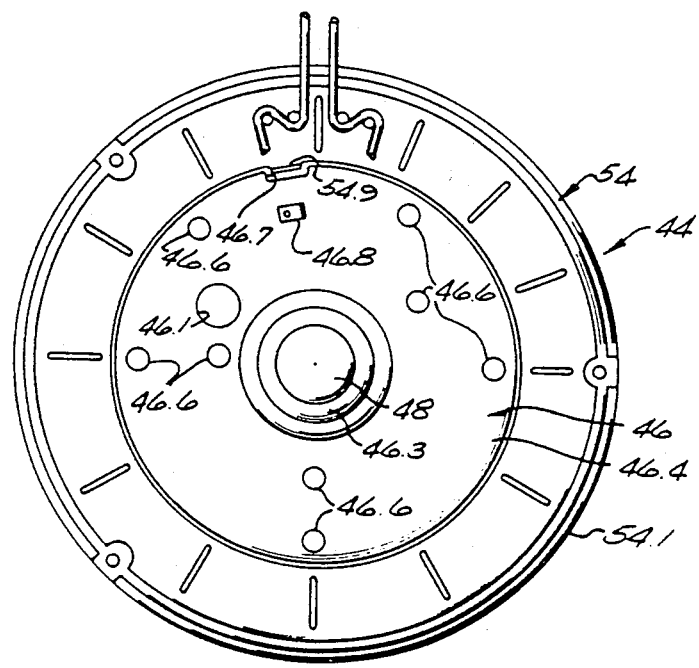
FIG. 4 is a section view similar to FIG. 3 illustrating the cover heater with a component thereof removed.

In accordance with this invention a compact canister cover heater 44 is fitted over the bottom air entry of the canister for heating air which is drawn into the canister to provide improved purging of the carbon material 30 in the system as above described. In a preferred embodiment, the cover 44 comprises a heat-spreading member 46 which is preferably formed by blanking from a sheet metal material such as aluminum having relatively high electrical and thermal conductivity. As is best shown in FIG. 4, the plate is preferably provided with an air-flow opening 46.1 in a peripheral portion of the plate, has a depressed central portion 46.2 forming a small recess 46.3 in one side 46.4 of the plate and a corresponding protuberance 46.5 from an opposite side of the plate, and has a plurality of mounting openings 46.6 and a locating notch 46.7 at spaced locations around the plate.

A self-regulating heater disc element 48 of an electrical resistance material of positive temperature coefficient of resistivity is secured in heat-transfer relation to the heat-spreading plate. Preferably for example, the heater disc is formed of a lanthanum-doped barium titanate ceramic material having metal contact layers 48.1, 48.2 on opposite sides thereof, one contact layer 48.1 being secured in electrically and thermally conducting relation to said one plate side 46.4 at a central location on the plate within the recess 46.3 by means of solder or an electrically conductive adhesive or the like. A terminal 46.8 is preferably secured to the plate by riveting or the like. As such positive temperature coefficient heaters are well known they are not further described herein and it will be understood that when such heater elements are electrically energized to generate heat, they are adapted to self-heat and increase in resistivity for reducing their heat output until the self-regulated heater temperature stabilizes at a safe temperature level such as 180° C. or the like at which heat generation is balanced by heat dissipation. Such heaters are sufficient to provide desired heating while assuring there is no risk of overheating such as might cause risk of igniting fuel vapors in a canister.

Figure 3:
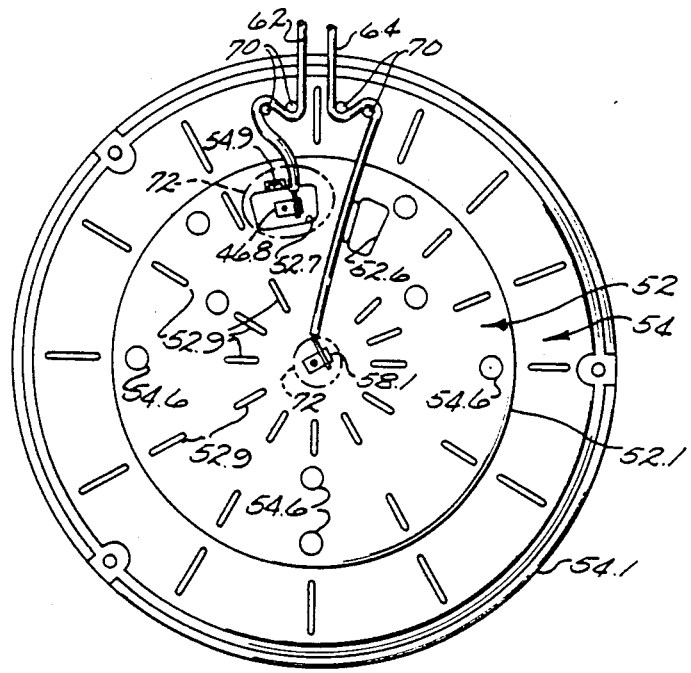
FIG. 3 is a section view along line 3—3 of FIG. 2 illustrating the canister cover heater of this invention.
Figure 5:
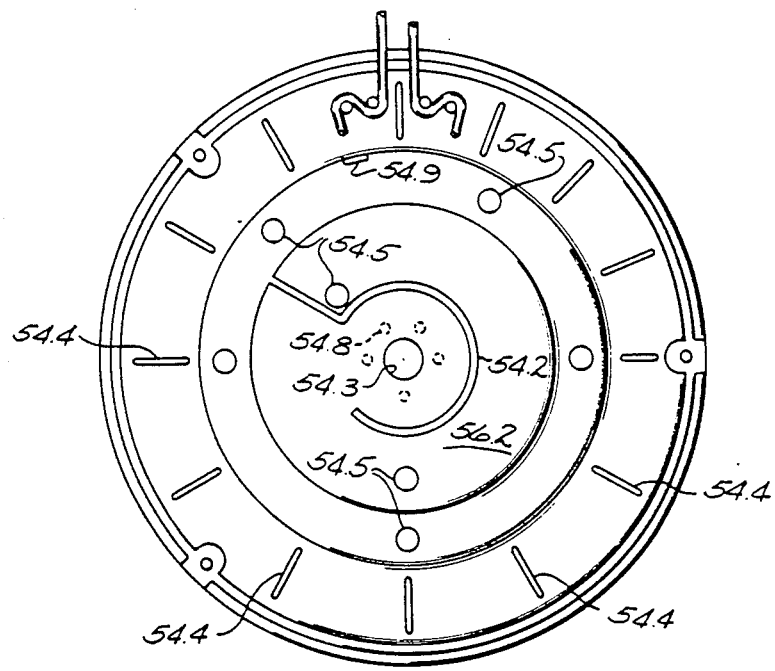
FIG. 5 is a section view similar to FIG. 4 illustrating the cover heater with an additional component thereof removed.
Figure 6:
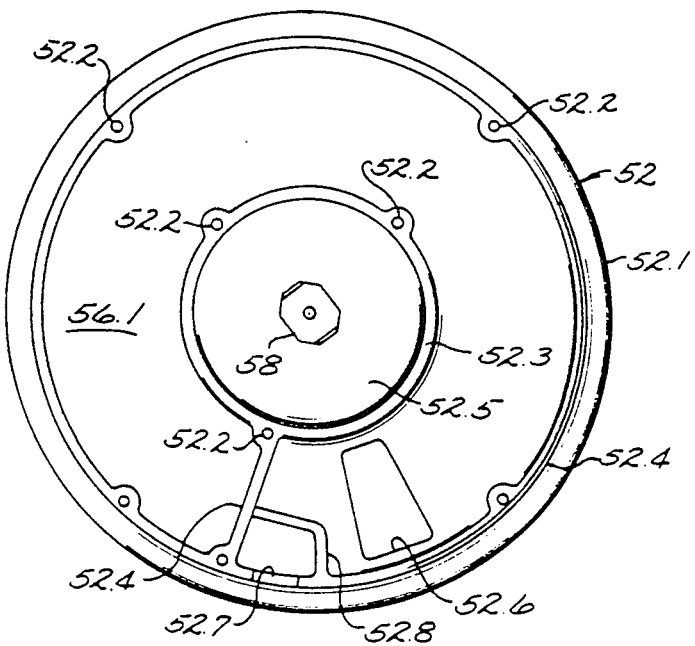
FIG. 6 is a section view along lines 6—6 of FIG. 2.

A first cover means 50 comprising a pair of cover halves 52 and 54 of a thermally and electrically insulating material such as glass-filled nylon or the like has the cover halves secured over respective opposite sides of the heat-spreading plate 46 for defining a thin, inner air flow path section 56 to pass air being introduced into the canister over the heat-spreading plate. Preferably, one cover half 52 has a generally circular portion 52.1 with a plurality of mounting openings 52.2 at spaced locations around the cover half. The cover half also has ribs 52.3 and 52.4 best shown in FIGS. 2 and 6 for engaging the heat-spreading plate to form a chamber 52.5 enclosing the heater disc and to define a portion 56.1 of the thin inner air flow path section with a winding configuration which extends over the peripheral portion of said one plate side around the heater chamber An electrically conductive spring 58 and a terminal 58.1 are electrically connected together at opposite sides of the cover half 52 by riveting as shown in FIGS. 3 and 6. The cover half 52 is also provided with an opening 52.6 near the periphery of the cover half communicating with the inner air flow path section 56 and with an opening 52.7 having a rib 52.8 therearound for fitting over the plate terminal 46.8 as shown in FIG. 3. Projections 52.9 are preferably disposed at spaced locations on an opposite side of the cover half 52 for a purpose discussed below. The cover half 54 best shown in FIGS. 3 and 5 has a corresponding circular portion 54.1 of relatively larger diameter than the cover half 52 and has ribs 54.2 engaging an opposite side of the heat-spreading plate 46 for cooperating with a stepped part 57 defining another portion 56.2 of the inner air flow path section which communicates with the plate opening 46.1, which extends in a flow path of winding configuration around the peripheral portion of the opposite plate side, and which ends at the center of the opposite plate side around the plate protuberance 46.5, where the plate is adapted to be heated to its highest temperature level by the heater 48. The cover half 54 has a central opening 54.3 which is aligned with the protuberance 46.5 and with the heater disc 48. The cover half 54 preferably has projections 54.4 thereon corresponding to the projections 52.9 on the other cover half previously described. In a preferred embodiment of the invention, the cover half 54 has an integral locating boss 54.9 meshing with the notches 46.7 and opening 52.7 in the plate 46 and cover half 52 respectively, has integral pins 54.5 fitted through the mounting openings 46.6 and 52.2 in the plate and cover half 52 respectively, and has the distal ends of the pins 54.5 ultrasonically headed over as indicated at 54.6 for securing the cover halves 52 and 54 to the heat-spreading plate 46 and for holding the electrically conductive spring 58 in resilient electrical engagement with the opposite contact layer 48.2 on the heater disc element 48. Preferably the cover half has a plurality of integral detents or latches 54.7 detachably engaged with the canister bottom 32 for securing the cover heater 44 to the filter canister and preferably a gasket member 60 is secured between the air entry cover 44 and the canister bottom 32 as shown in FIG. 2. However if desired, the cover half 54 is adapted to be adhesively secured to the canister bottom 32 or to be attached to the canister bottom by spin welding or the like. Preferably the cover half 54 has a plurality of projections 54.8 spaced around the central opening 54.3 for a purpose discussed below.

In that arrangement, means such as lead wires 62, 64 are connected to the heat-spreading plate terminal 46.8 and to the terminal 58.1 connected to the conductive spring 58 for electrically connecting the heater disc element in an automotive power supply system as is diagrammatically indicated by supply terminals 65, 66 in FIG. 1. Preferably, pairs of posts 70 are provided on the cover half 54 as indicated in FIG. 3 and the insulated lead wires 62, 64 are wrapped on the posts to provide strain relief and are soldered or otherwise electrically connected to the terminals 46.8 and 58.1, the electrical connections to the terminals then being potted with epoxy or the like as indicated at 72 in FIG. 3. If desired, a thermally or manually responsive switch or the like is incorporated in the heater circuit as diagrammatically indicated at 68 in FIG. 1 for selectively interrupting heater operation.

In accordance with this invention, the air entry cover heater 44 further includes a second cover means 74 of thermally insulating material defining a thin outer air flow path section 76 overlying and connected to the inner flow path section 56 to pass air over the first cover means 50 prior to advancing the air into the inner flow path section 56. Preferably as shown in FIG. 3, the second cover means comprises a porous filter pad 78 of a thermally insulating material such as fiberglass or the like and a support means such as an annular member 80 formed of a glass-filled nylon or the like having a large central opening 80.1 and an inturned flange 80.2 holding the filter pad 78 against the projections 52.9 and 54.4 on the first cover means for defining the thin outer flow path section 76. The annular member is secured to the first cover means by rivets 80.3 or in other conventional manner.

In that arrangement, the heater disc element 48 is adapted to be energized when operation of the engine 27 is initiated for generating and transferring heat to the heat-spreading plate so that such heat is spread radially outward from the center of the plate. Engine vacuum then initiates purging flow of fresh air into the canister 12 as indicated by the arrow 24. The air is drawn through all parts of the filter pad 78 into the thin outer air flow path section 76 and is guided by that path section to pass closely over the outer surface of the cover half 52 and into the inner flow path section 56 through the cover half opening 52.6. The air then flows over the heat-spreading plate 46 in a winding path configuration around the peripheral portion of one side of the plate in the inner path portion and through the plate opening 46.1 into the other inner air flow path section 56.2. As the heater is enclosed in a chamber it is substantially shielded from the flow of gas vapors over the heater. The air then passes serially over the opposite side of the heat-spreading plate in a path of winding configuration around the peripheral portion of the plate and over the protuberance 46.5 at the center of the plate to pass into the air outlet opening 54.3 into the canister 12. In that arrangement, the heat is transferred from the heat-spreading plate 46 to the air passing through the inner air path flow section 56. The cover half 52 is formed of thermally insulating material and tends to retard heat loss therethrough but does tend to receive some additional heat from the air being heated in the flow path section 56. However the air passing through the outer air flow path section 76 withdraws that additional heat from the first cover means for preheating the air to improve air heating efficiency. The thermally insulating nature of the filter path 78 in the second cover means further retards heat loss with the result that the canister cover heater 44 provides improved heating efficiency for the vapor canister to minimize drain on the vehicle power supply in performing the canister purging function. The projections 54.8 spaced around the heating cover outlet opening prevent possible clogging of the outlet if the canister grid 38, 40 should sag due to the weight of the material 30 while the canister is being heated. The air passing through the outlet into the canister is passed over the hottest portion of the heater at the plate protuberance immediately prior to being passed through the outlet into the canister.

Figure 7:
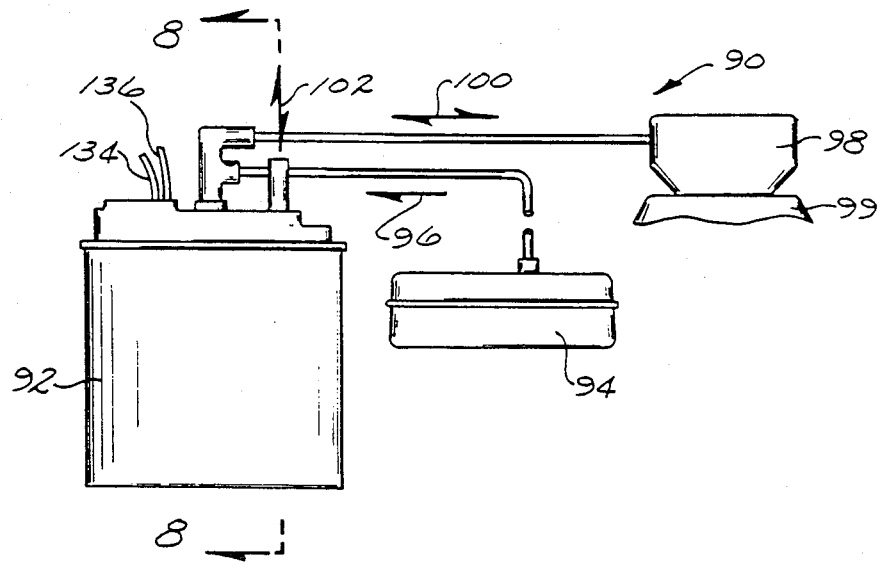
FIG. 7 is a diagrammatic view similar to FIG. 1 illustrating a top air entry automotive canister evaporative emissions system.
Figure 8:
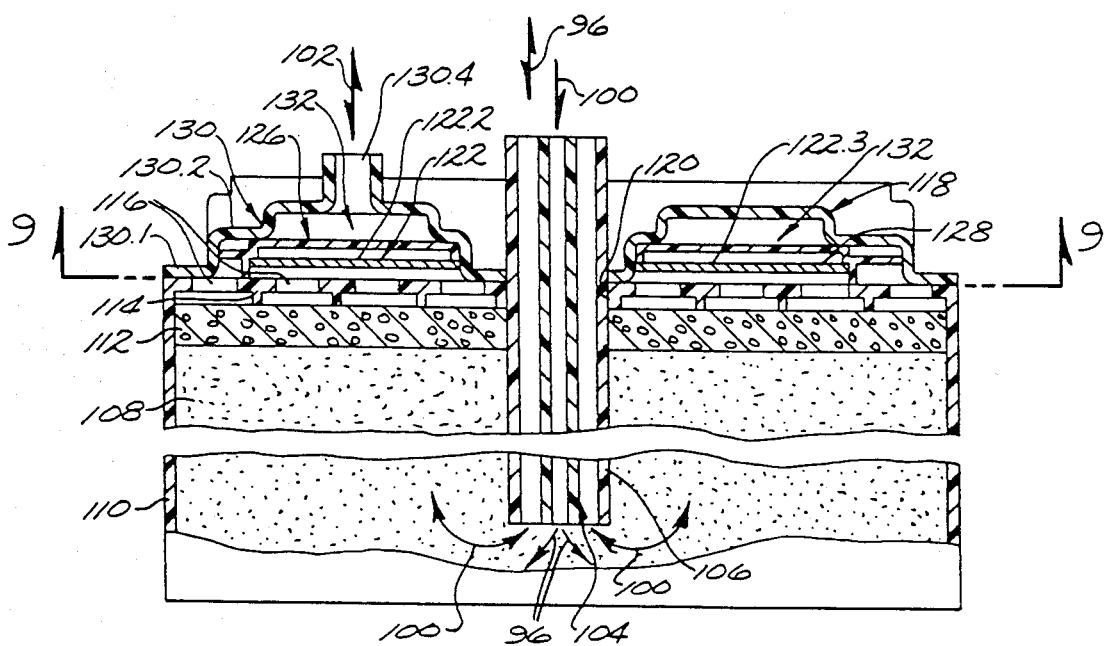
FIG. 8 is an enlarged partial, front elevation view, partially in section (with some tube components removed) of the canister of FIG. 7 illustrating an alternate preferred embodiment of the canister cover heater of this invention.

In another alternate preferred embodiment of the invention as diagrammatically illustrated in FIG. 7, a top air entry automotive vapor canister system 90 is shown to include a filter canister 92 which is arranged to receive vapors from a fuel tank 94 as indicated by arrow 96 and to receive and return vapors from and to the carburetor 98 or other portion of the intake system on an engine 99 as indicated by arrow 100, thereby to filter such vapors before releasing vapor-free air to the surrounding atmosphere or to provide fresh purging air into the canister as indicated by the arrow 102. As a top air entry vapor canister is well known, it is not further described herein and it will be understood that vapors from the fuel tank and carburetor or the like are adapted to enter the filter canister through the top of the canister and to be fed down to the bottom of the canister through tubes 104 and 106 respectively as indicated in FIG. 8 so that contaminants such as Water vapors Which may be introduced with fuel vapors and the like are permitted to accumulate only at the bottom of the canister away from the filter materials in the canister so they will not contaminate the carbon particles. Carbon granules 108 are disposed within the canister cylinder 110 with a porous, foam, granule-retaining pad 112 fitted over the top of the granules under a grid 114 having openings 116 therein provided at the top of the canister cylinder.

Figure 9:
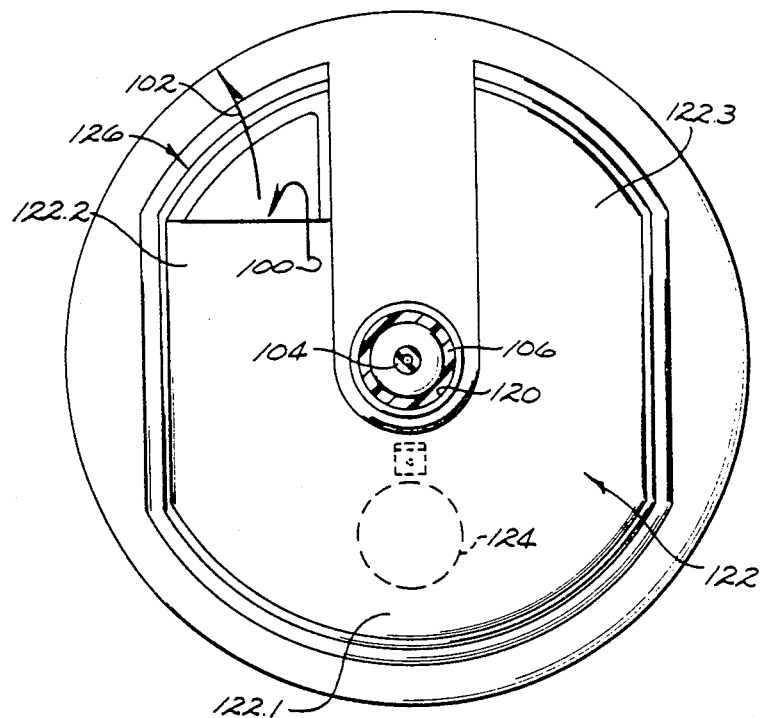
FIG. 9 is a section view along line 9—9 of FIG. 8 illustrating the canister cover heater of FIG. 8.
Figure 10:
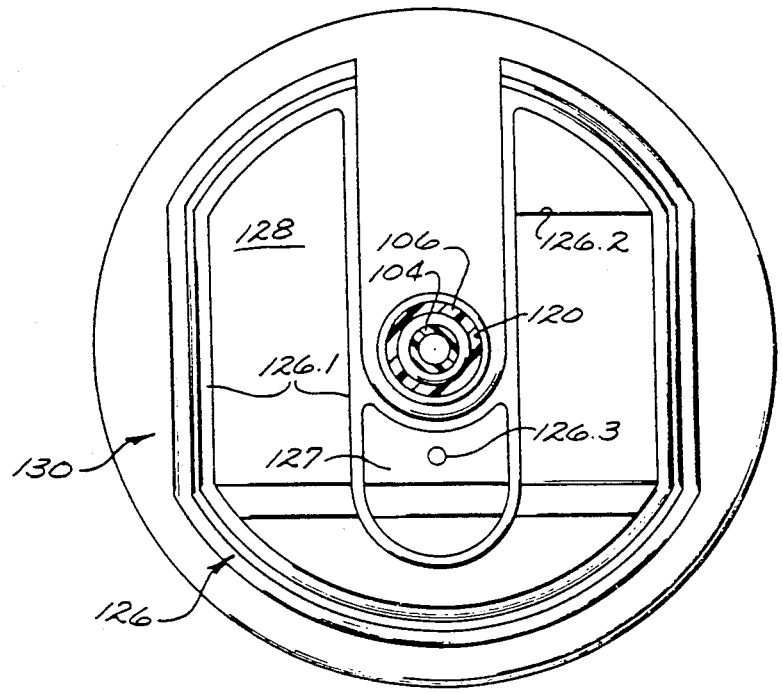
FIG. 10 is a section view similar to FIG. 9 illustrating the canister cover heater of FIG. 9 with a component thereof removed.
Figure 11:
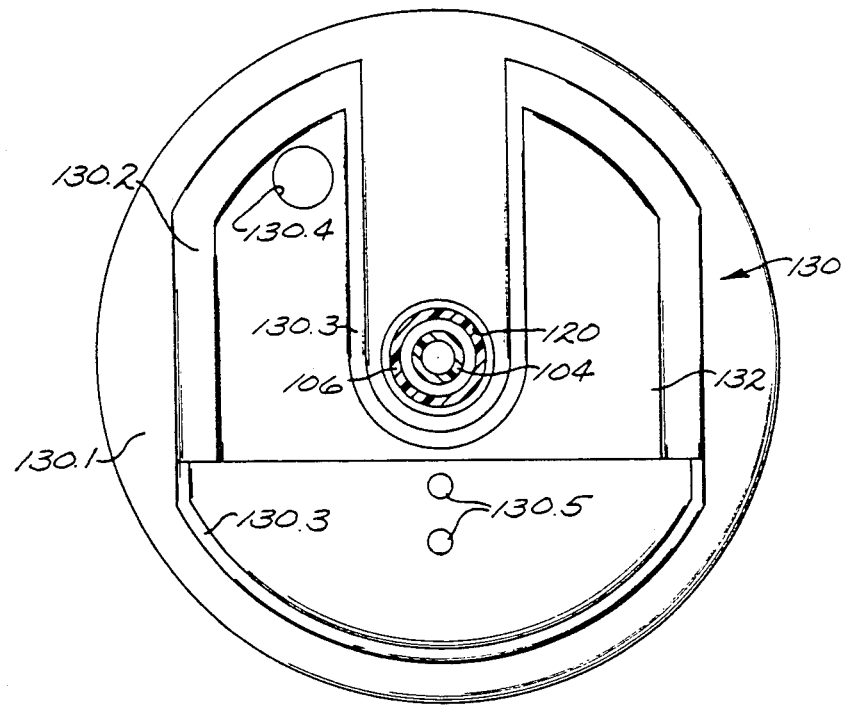
FIG. 11 is a section view similar to FIG. 10 illustrating the canister cover heater of FIG. 10 with an additional component thereof removed.

In accordance with this invention, an improved canister cover heater 118 is attached to the top of the canister cylinder by spin welding or in other conventional manner and has an opening 120 therein adapted to fit over the vapor entry opening for the canister tubes 104 and 106 as illustrated in FIG. 8. In this alternate preferred embodiment, an U-shaped heat-spreader plate 122 is formed of a sheet metal material such as aluminum and is arranged so that a base portion 122.1 and two legs 122.2, 122.3 of the plate extend around the vapor entry opening leaving one side of the vapor entry opening free for access thereto as best shown in FIG. 9. A heater disc element 124 corresponding to the heater element 48 previously described is secured in heat-transfer relation to the heat-spreader plate at a central part of the base portion of the plate as shown in FIG. 9. A first cover member 126 of a thermally insulating material is secured over one side of the heat-spreader plate by adhesive means or the like along the edge of the plate for defining a thin, U-shaped inner air flow path section 128 in overlying relating to the heat-spreading plate 122. The first cover member has ribs 126.1 as shown in FIG. 10 for engaging the heat-spreading plate to form a chamber 127 enclosing the heater disc 124 and for defining a thin inner air flow path 128 and has an opening 126.2 therein communicating with that inner flow path section. A second cover means 130 also of a thermally insulating material has a flange part 130.1 for securing the cover heater 118 as a whole to the canister 92 by spin welding or the like, has a shoulder 130.2 for receiving the first cover member adhesively secured thereon in any conventional manner, has ribs 130.3 engaging the first cover member for defining a thin U-shaped outer air flow path section 132 overlying and communicating with the inner flow path section 128 through the opening 126.2, and has an air inlet opening 130.4. Leads 134, 136 extend through openings 126.3 and 130.5 and are connected to the heat-spreader plate and heater element respectively in any conventional manner (not shown) for energizing the heater element as will be understood.

In that arrangement, fuel vapor and the like are introduced into the filter canister as indicated by arrows 96 and 100 for filtering the vapors before releasing vapor-free air to the atmosphere as indicated by arrow 102 when the engine 99 is not being operated. However when engine operation is resumed, fresh air is drawn in at opening 130.4 and is passed serially through the outer flow path section 132, the opening 126.2, and the inner flow path 128 to pass into the canister over an end of heat-spreader plate leg as indicated by arrow 102 in FIG. 9. The heater element 124 is energized to transfer heat along the legs of the heat-spreader plate for rapidly heating air in the inner flow path 128 and to transfer some additional heat to the first cover means. However the air is also passed over the first cover means for withdrawing that additional heat to preheat the air and improve air heating efficiency.

Figure 12:
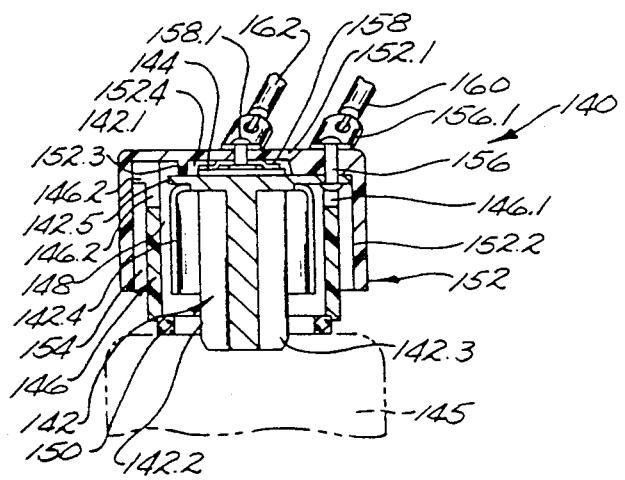
FIG. 12 is a section view similar to FIG. 9 illustrating another alternate preferred embodiment of the canister cover heater of this invention.

In another alternate preferred embodiment of this invention as illustrated at 140 in FIG. 12, the improved cover heater is shown to include a heat-spreading metal stud 142 of aluminum or the like having a self-regulating electrical resistance heater disc element 144 of positive temperature coefficient of resistivity secured in electrically and thermally conducting relation to one end 142.1 of the stud. Preferably the stud has a generally cylindrical peripheral heat-exchange surface 142.2 which is preferably slotted as at 142.3 to be received with a press fit or the like part way into an air entry tube of a canister (diagrammatically indicated at 145) for mounting the cover 140 on the canister while permitting air to enter the canister via the slots 142.3. If desired, additional metal heat-transfer means such as the sleeve 142.4 are provided on the stud and preferably the stud has a flange 142.5 for accommodating the heater element thereon. A first cover sleeve 146 of a thermally insulating material is fitted over the stud 142 for defining a thin cylindrical inner air flow path section 148 around the heat-spreading stud, the first cover sleeve having notches 146.1 thereon for permitting air to flow through the notches and having a flange 146.2. Preferably a gasket 150 is adhesively secured to the sleeve for sealing to the canister. A second cup-shaped cover member 152 having a bottom 152.1 and a side-wall 152.2 is fitted over the first cover sleeve for defining a thin, cylindrical, outer air flow path section 154 around the first cover sleeve. The flange 146.2 of the first cover sleeve is adhesively or otherwise secured to the second cup-shaped cover member and the cup-shape member has a rib 152.3 on its bottom engaging a stud flange 142.5 forming a chamber 152.4 enclosing the heater element. The cup-shaped cover member is attached to the stud flange by riveting as at 156 which also serves to electrically connect the stud to a terminal 156.1 outside the cup. Similarly, a spring contact 158 is also secured to the cup-shaped cover member by riveting for resiliently electrically connecting one side of the heater element 144 to a second terminal 158.1 outside the cup member. Leads 160 and 162 are connected to the terminals and serve to electrically connect the heater element in an automotive power supply circuit as will be understood. In that arrangement, when an engine is operated for drawing air into the canister, the air passes serially through the outer and inner flow path sections 154, 148 and over the heat-spreading stud 142. Heat is transferred to the air in the inner flow path section and some additional heat is also transferred to the first cover sleeve. However the air is passed over that first cover sleeve in the outer air flow path section for withdrawing that additional heat from the first cover sleeve to preheat the air and improve air heating efficiency.

It should be uderstood that although particular embodiments of this invention have been described by way of illustrating the invention, this member includes all modifications and equivalents of the disclosed embodiments falling within the scope of the appended claims.

We claim:

1. A compact canister cover heater for a top air entry opening of an automotive vapor canister having a top vapor entry to the canister for heating air introduced into the top air entry to the canister to purge the canister comprising a U-shaped heat-spreading plate of a sheet metal material of relatively high thermal conductivity having a base and a pair of legs to extend around a top vapor entry of a vapor canister, a self-regulating heater disc element of an electrical resistance material of positive temperature coefficient of resistivity secured in heat-transfer relation to a central portion of one side of the base of the U-shaped heat-spreading plate, means for electrically energizing the heater disc element to generate and transfer heat to the heat-spreading plate, a first cover means of thermally insulating material secured over said one side of the heat-spreader plate and having ribs engaging said one plate side forming an enclosure around the heater disc element and defining a thin, U-shaped inner flow path section to pass air being introduced into the canister serially over the legs and base portion of the U-shaped heat-spreading plate for transferring heat to the air and to receive additional heat within the first cover means, the first cover means having an air inlet means therein at one end of said inner flow path section and providing an air outlet to the canister at an opposite end of the inner flow path section, and second cover means of thermally insulating material secured over the first cover means defining a thin U-shaped outer flow path section overlying the inner flow path section provided by the first cover means, the second cover means having an air entry opening at one end of the outer flow path section and communicating with the air inlet in the first cover means at an opposite end of the outer flow path section to pass the air over the first cover means prior to being advanced into the inner flow path section for withdrawing said additional heat from the first cover means to preheat the air and improve air heating efficiency.

2. A compact canister cover heater for a top air entry opening of an automotive vapor canister for heating air introduced into the canister to purge the canister comprising a heat-spreading stud of a metal material of relatively high thermal conductivity having an end and a peripheral heat-exchanging surface, a self-regulating heater disc element of an electrical resistance material of positive temperature coefficient of resistivity secured in heat-transfer relation to said stud end, means for electrically energizing the heater disc element to generate and transfer heat tot he heat-spreading stud, a first cover sleeve of thermally insulating material disposed around the heat-exchanging stud surface defining a thin cylindrical inner flow path section over the heat-exchanging stud surface, the first cover sleeve having openings in the periphery thereof at one end to pass air being introduced into the canister over the heat-exchanging stud surface for transferring heat to the air and to receive additional heat within the first cover sleeve, and a second cup-shaped cover member of thermally insulating material having a cup-bottom of the member secured to the stud and having a cup side wall fitted around the first cover sleeve, the cup-shaped cover member having ribs engaging the stud end forming an enclosure for the heater disc element and being attached to the first cover sleeve for defining a thin outer flow path section overlying and connected to the inner flow path section through said sleeve openings to pass the air over the first cover sleeve prior to being advanced into the inner flow path section for withdrawing said additional heat from the first cover sleeve to preheat the air and improve air heating efficiency.

* * * * *